(12) United States Patent
Gray et al.

(10) Patent No.: US 10,585,798 B2
(45) Date of Patent: Mar. 10, 2020

(54) TRACKING CACHE LINE CONSUMPTION

(71) Applicant: Intel Corporation, Santa Clara, CA (US)

(72) Inventors: Mark Gray, Ennis (IE); Tomasz Kantecki, Ennis (IE)

(73) Assignee: Intel Corporation, Santa Clara, CA (US)

( * ) Notice: Subject to any disclaimer, the term of this patent is extended or adjusted under 35 U.S.C. 154(b) by 29 days.

(21) Appl. No.: 15/823,516

(22) Filed: Nov. 27, 2017

(65) Prior Publication Data

US 2019/0163630 A1 May 30, 2019

(51) Int. Cl.
| | | |
|---|---|---|
| *G06F 12/08* | (2016.01) | |
| *G06F 12/0811* | (2016.01) | |
| *H04L 29/12* | (2006.01) | |
| *G06F 12/0804* | (2016.01) | |
| *G06F 11/30* | (2006.01) | |
| *G06F 11/34* | (2006.01) | |

(52) U.S. Cl.
CPC ...... *G06F 12/0811* (2013.01); *G06F 11/3037* (2013.01); *G06F 11/3409* (2013.01); *G06F 12/0804* (2013.01); *H04L 61/6022* (2013.01)

(58) Field of Classification Search
CPC .. G06F 12/08; G06F 12/0811; G06F 12/0804; G06F 11/3037; G06F 11/30; H04L 61/6022; H04L 29/12
USPC .................................................. 711/128, 122
See application file for complete search history.

(56) References Cited

U.S. PATENT DOCUMENTS

| | | | | |
|---|---|---|---|---|
| 8,347,036 B2* | 1/2013 | Cargnoni | ............ | G06F 12/0811 711/118 |
| 2002/0124144 A1* | 9/2002 | Gharachorloo | ..... | G06F 12/0826 711/145 |
| 2010/0262784 A1* | 10/2010 | Guthrie | ............... | G06F 12/0811 711/122 |
| 2014/0149685 A1* | 5/2014 | Liang | .................. | G06F 12/0804 711/144 |
| 2015/0378739 A1* | 12/2015 | Gschwind | ............. | G06F 9/3861 712/225 |

OTHER PUBLICATIONS

"Benefits of Intel Cache Monitoring Technology in the Intel Xeon Processor E5 v3 Family", https://software.intel.com/en-us/blogs/2014/12/11/intels-cache-monitoring-technology-use-models-and-data, 4 pages, Sep. 8, 2014.

(Continued)

*Primary Examiner* — Pierre Miche Bataille
(74) *Attorney, Agent, or Firm* — Lowenstein Sandler LLP

(57) ABSTRACT

Systems and methods for tracking cache line consumption. An example system may comprise: a cache comprising a plurality of cache entries for storing a plurality of cache lines; a processing core, operatively coupled to the cache; and a cache control logic, to: responsive to detecting an update operation with respect to a cache line of the plurality of cache lines, set a cache line access tracking flag associated with the cache line to a first state indicating that the cache line has been produced; and responsive to detecting a read operation with respect to the cache line, set the cache line access tracking flag associated with the cache line to a second state indicating that the cache line has been consumed.

19 Claims, 14 Drawing Sheets

(56) References Cited

OTHER PUBLICATIONS

"Intel's Cache Monitoring Technology Software-Visible Interfaces", https://software.intel.com/en-us/blogs/2014/12/11/intel-s-cache-monitoring-technology-software-visible-interfaces, 7 pages, Dec. 11, 2014.

"Benefits of Intel Cache Monitoring Technology in the Intel Xeon Processor E5 v3 Family", https://software.intel.com/en-us/blogs/2014/06/18/benefit-of-cache-monitoring, 4 pages, Sep. 8, 2014.

* cited by examiner

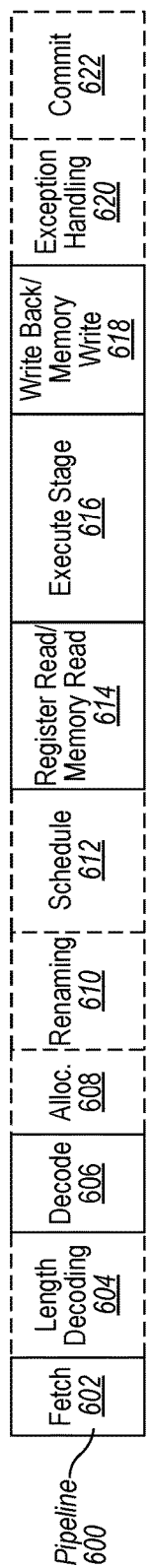
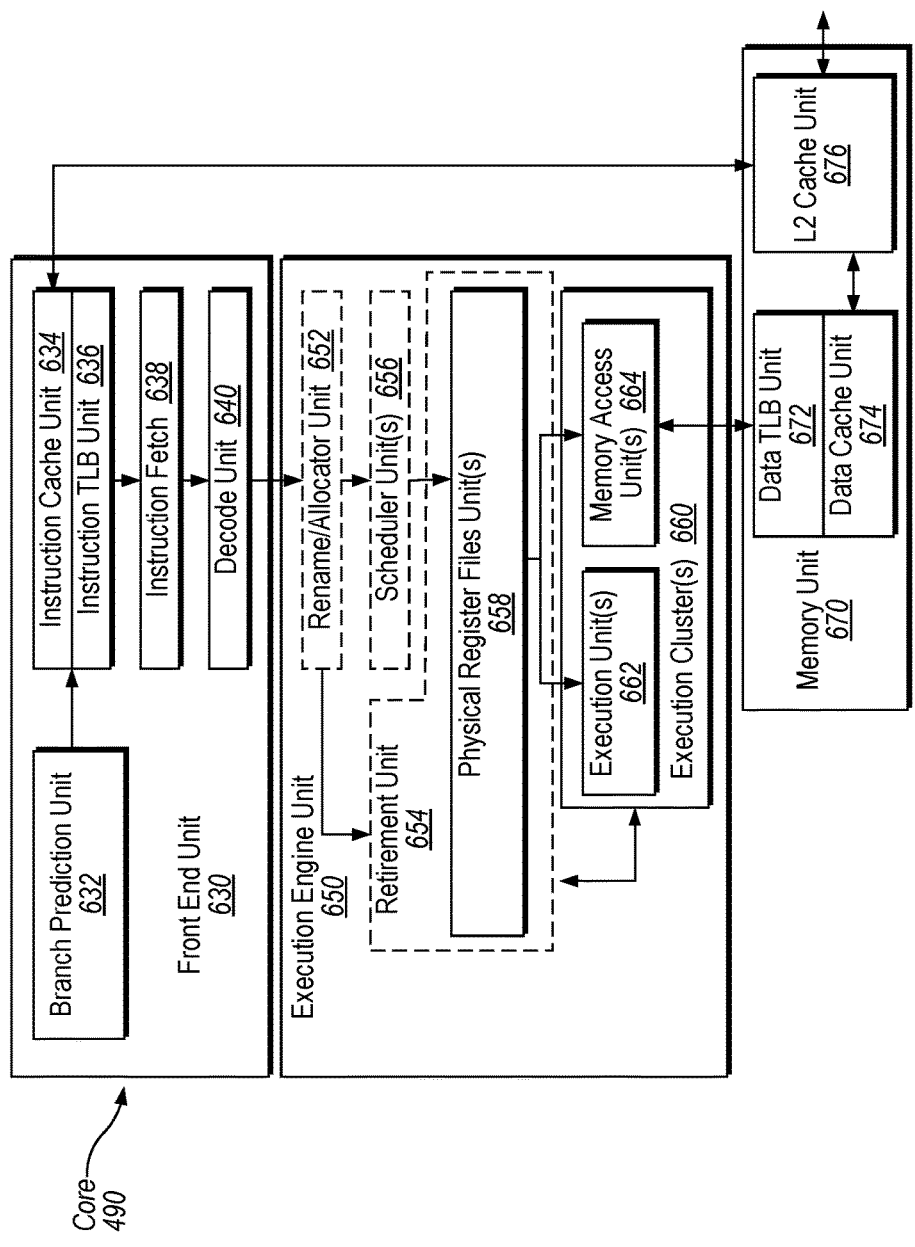
FIG. 8A
FIG. 8B

TRACKING CACHE LINE CONSUMPTION

The present disclosure generally relates to information processing and, more specifically, relates to managing memory cache.

BACKGROUND

A cache is a memory device that transparently stores copies of certain main memory locations such that future requests for data stored in those memory locations may be satisfied more efficiently: if the requested data is found in the cache, the request is handled by reading the cache, which is comparatively faster than reading the main memory. Certain processors have multiple independent caches, including instruction and data caches, where the data cache is usually organized as a hierarchy of multiple cache levels.

BRIEF DESCRIPTION OF THE DRAWINGS

The present disclosure is illustrated by way of examples, and not by way of limitation, and may be more fully understood with references to the following detailed description when considered in connection with the figures.

FIGS. 8A-8B illustrate elements of a processor microarchitecture, in accordance with one or more aspects of the present disclosure.

DETAILED DESCRIPTION

Figure 1:
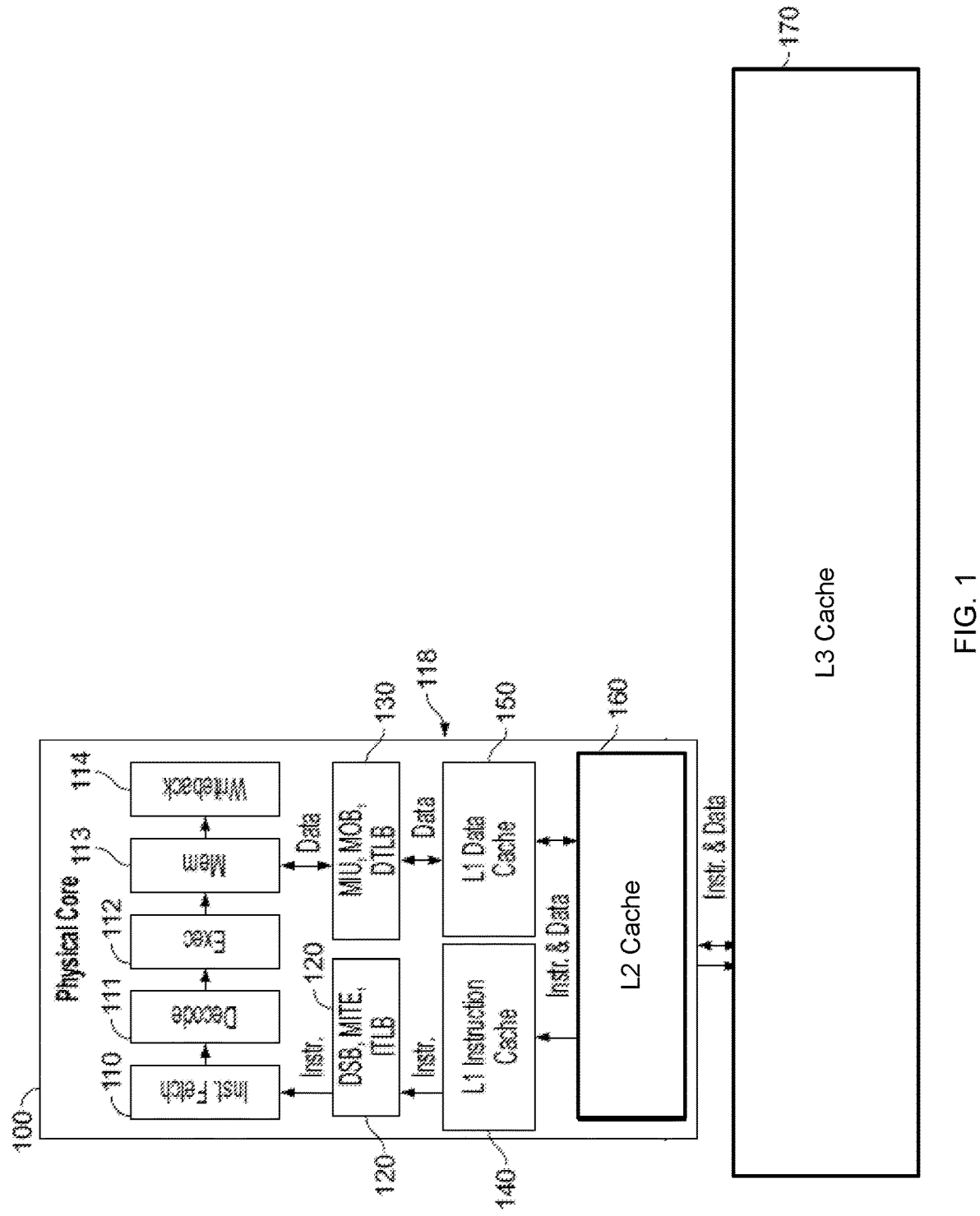
FIG. 1 an example diagram of a processing system operating in accordance with one or more aspects of the present disclosure.

Described herein are systems and methods for tracking cache line consumption.

When a processor needs to read data from or write data to a memory location, the cache controller may first determine whether a valid copy of that data is stored in a cache. If so, the processor immediately reads the data from or write the data to the cache, which is significantly more efficient than reading from or writing to the next level memory (such as the next level cache or the main memory).

Data items of fixed size that are transferred between the next level memory and the cache are referred to as cache lines. When a data item is copied from the memory into the cache, a cache entry is created. The cache entry includes the data item, the identifier of the corresponding memory location (also referred to as a tag), and metadata including one or more flags indicating the state of the cache entry. In an illustrative example, a cache entry is referred to as "dirty" if the cached value had been modified since it was fetched from the next level memory (such as next level cache or main memory), and is referred to as "clean" if the cached value had not been modified since it was fetched from the next level memory.

A cache hit occurs when a valid copy of the requested memory location is found in the cache; otherwise, a cache miss occurs, and the cache controller allocates a new cache entry for storing the contents of the requested memory location, so that future requests to that memory location would be resolved by the newly created cache entry. In order to accommodate the new entry on a cache miss, the cache controller needs to evict (i.e., remove from the cache) one of the existing entries. In certain implementations, the cache controller may evict the least recently used (LRU) cache entry.

Larger caches are known to have better hit rates but longer latency. Certain processing systems address this conflict by using multiple levels of cache, with small fast caches backed up by larger, slower caches. Multi-level caches generally operate by checking the fastest, level 1 (L1) cache first; if it hits, the processor proceeds at high speed. If that smaller cache misses, the next fastest cache (level 2, L2) is checked, and the procedure is repeated until a cache hit occurs or all cache levels reported cache misses and the request is forwarded to the main memory.

However, a LRU-based eviction policy may be ineffective as it may evict a cache line which has not yet been consumed (accessed) after having been produced (created or updated). A high-throughput application may continually populate the cache with new cache lines. Each cache write may force an eviction of the LRU cache line. Eviction of cache lines which have not been consumed may degrade the overall system performance as the cache lines may be evicted just a short period of time before they would have been consumed. Furthermore, eviction of a large number of cache lines which have not been consumed may be indicative of a performance bottleneck in the application that is supposed to be consuming the cache lines. In an illustrative example, a network interface card (NIC) driver directly populates the cache via Data Direct Input/Output (DDIO). Stalling the application consuming the received network packets while the NIC driver continues to write new network packets to the cache would lead to eviction of a large number of cache lines which have not been consumed. In another illustrative example, in a software network application two processing cores communicate via a memory buffer. The processing core reading the buffer at the rate which is lower than the rate of the processing core writing to the buffer would lead to eviction of a large number of cache lines which have not been consumed.

Various known cache monitoring technologies fail to provide the information which would allow detection of the above-described and other similar situations leading to eviction of a large number of cache lines which have not been consumed. The present disclosure addresses this and other deficiencies of known cache monitoring technologies, by expanding the cache line metadata to include a cache line access tracking flag, the state of which indicates whether the cache line has been produced (updated) or consumed (read).

The cache line access tracking flags is then read by the platform hardware and is exposed to a cache monitoring application. In certain implementations, states of one or more cache line access tracking flags are provided to the application via a performance monitoring unit (PMU) or a dedicated model-specific register (MSR), as described in more detail herein below. The cache monitoring application may be employed to trigger a corrective action, which may be defined by a set of configurable rules, as described in more detail herein below.

Thus, systems and methods disclosed herein provide a substantial improvement over the current state of the art, add significant flexibility at a low implementation cost, scale across central processing unit (CPU) generations and enable operating system or application-guided resource allocation policies for improved performance. Various aspects of the above referenced methods and systems are described in details herein below by way of examples, rather than by way of limitation.

Referring now to FIG. 1, which illustrates an example diagram of a processing system 100 operating in accordance with one or more aspects of the present disclosure, a processing core 100 comprises various elements to form a processing pipeline, including an instruction fetch unit 110, a decode unit 111, an execution unit 112, a memory interface unit (MIU) 113, a writeback unit 114, an instruction translation lookaside buffer (ITLB) 120 with the associated units comprising a decode stream buffer (DSB) and a macro-instruction translation engine (MITE), and data translation lookaside buffer (DTLB) 130 with the associated units comprising a memory order buffer (MOB) and a memory interface unit (MIU). The processing pipeline generates instruction fetches from the main decode pipeline (MITE). Instruction requests that miss the DSB are forwarded to the L1 instruction cache 140. Instruction requests which miss the L1 instruction cache 140 are forwarded to the unified L2 cache 160. Data requests are generated as a result of memory operations by the processing pipeline, and requests are made to the L1 data cache 150. Data requests that miss the L1 data cache 150 are forwarded to the unified L2 cache 160. Misses to the unified L2 cache are further forwarded to a unified external L3 cache 170, which may be shared among multiple processing cores.

Figure 2:
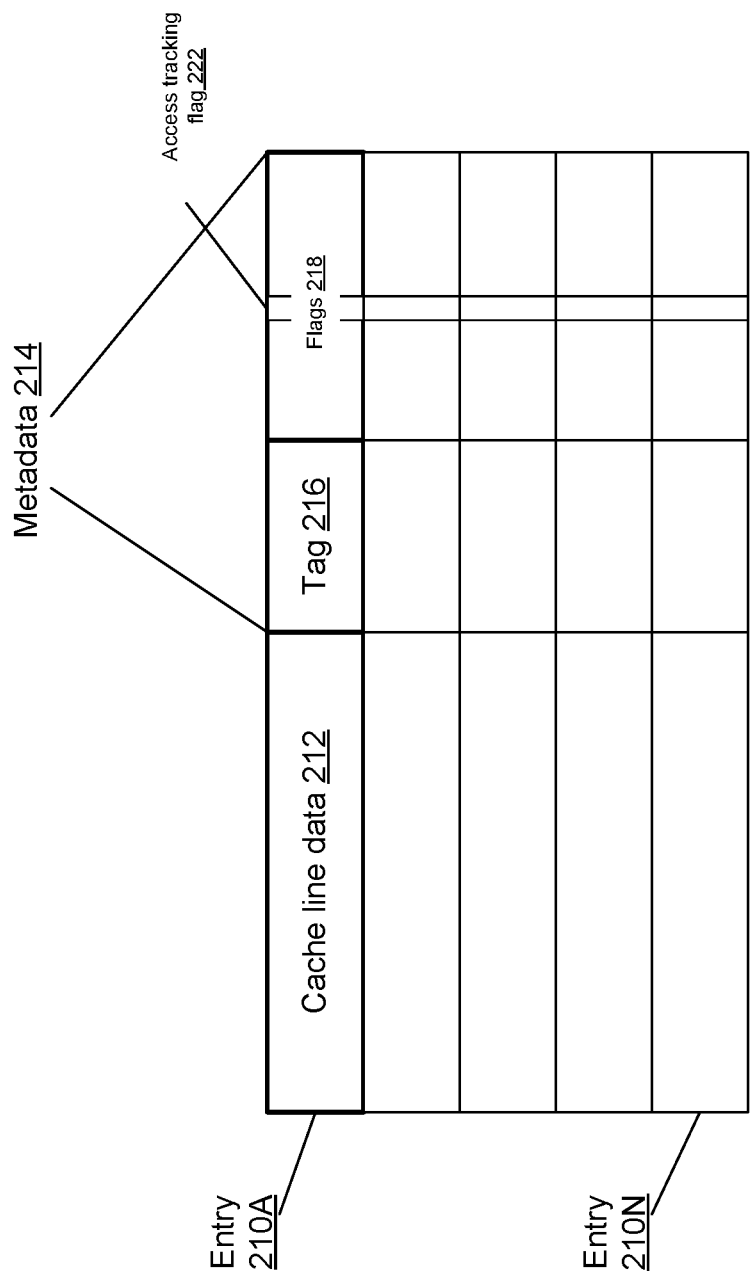
FIG. 2 schematically illustrates a simplified cache structure, in accordance with one or more aspects of the present disclosure.

FIG. 2 schematically illustrates a simplified cache structure, in accordance with one or more aspects of the present disclosure. An example cache 200, which may represent the L1 data cache, L2 unified cache or L3 cache, comprises a plurality of cache entries 210A-210N, which are organized in multiple sets and/or ways (not shown in FIG. 2 for clarity and conciseness). Each cache entry 210 stores a cache line including the cache line data 212 and the cache line metadata 214. The latter, in turn, includes the tag 216 specifying the memory address associated with the cache line, and further includes the flags 218, which may be set or cleared to indicate various aspects of the cache line state.

Figure 3:
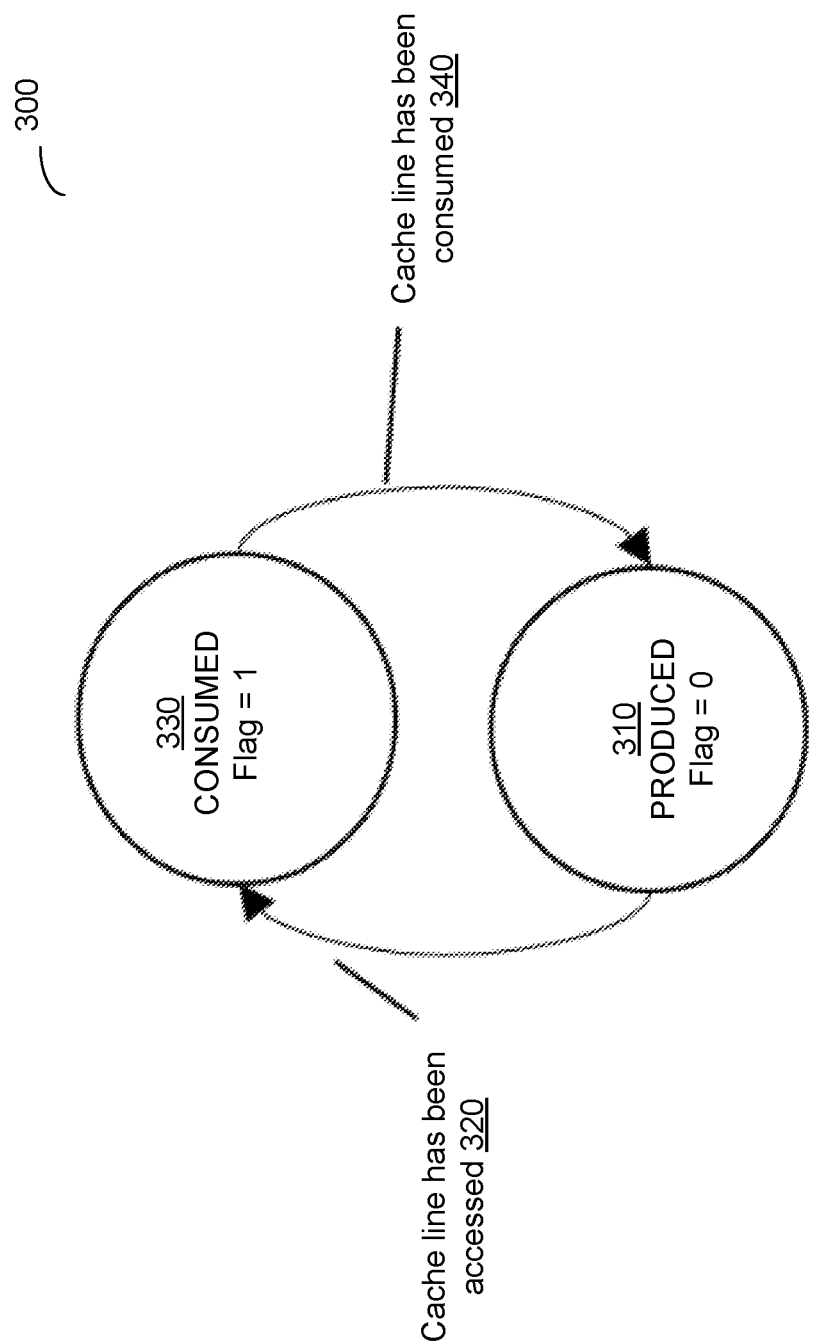
FIG. 3 schematically illustrates the graph of possible states of the cache line access tracking flag and transitions between those states, in accordance with one or more aspects of the present disclosure.

In accordance with one or more aspects of the present disclosure, the cache entry 210 includes a cache line access tracking flag 222, which is set or cleared by the cache controller to indicate whether the cache line stored by the cache entry has been produced (updated) or consumed (read). While FIGS. 2-3 show the cache line access tracking flag 222 as a single-bit flags, other data structures may be utilized for tracking the cache line states. In certain implementations, the cache line metadata may include timestamp fields (not shown in FIG. 2) which may indicate the time of the last update and/or last access to the cache line, in order to enable the LRU-based eviction policy. If both last update and last access timestamps are provided, those may be compared in order to determine the access status of the cache line: if the last access timestamp exceeds the last update timestamp, the cache line has been consumed after the last update. If only the last access timestamp is provided, the update of the cache line may set the last access timestamp to the maximum value in order to prevent the line from being evicted by the LRU policy while the cache contains at least one line that has been consumed after the last update.

FIG. 3 schematically illustrates the graph 300 of possible states of the cache line access tracking flag 222 and transitions between those states, in accordance with one or more aspects of the present disclosure. As schematically illustrated by FIG. 3, the flag 222 is indicative of the last operation performed on the associated cache line. If the cache line has been produced but has not been consumed, the flag 222 is set to the first state 310 (e.g., set to 0 or cleared), denoted as "Produced". Responsive to detecting an access operation 320 with respect to the cache line, the flag 222 is set to the second state 330 (e.g., set to 1), denoted as "Consumed". Responsive to detecting a write operation 340 with respect to the cache line, the flag 222 is reset to the "Consumed" state 340 (e.g., cleared).

The cache line access tracking flag 222 is read by the platform hardware and exposed to a cache monitoring application. In certain implementations, states of one or more cache line access tracking flags may be provided to the application via a performance monitoring unit (PMU) or a dedicated model-specific register (MSR).

One or more PMUs may be programmed to indicate certain aggregate functions (e.g., total numbers, ratios, frequency of changes, etc.) of the cache access tracking flag states. In an illustrative example, a PMU is programmed to indicate the frequency of switching states of one or more cache line access tracking flags. In another illustrative example, a PMU is programmed to indicate the ratio of the number of evicted cache lines which have not been read to the total number of evicted cache lines. In yet another illustrative example, a PMU is programmed to indicate the ratio of the number of evicted cache lines which have not been read to the total number of cache lines. In certain implementations, the processing core instruction set may be expanded to support an instruction returning the states of one or more cache line access tracking flags. The platform hardware may further provide a mechanism (e.g., via a model-specific register and/or a certain processor instruction, such as CPUID) for enumerating the platform capabilities related to cache monitoring, e.g., the supported PMUs and/or processor instructions returning the states of one or more cache line access tracking flags.

Figure 4:
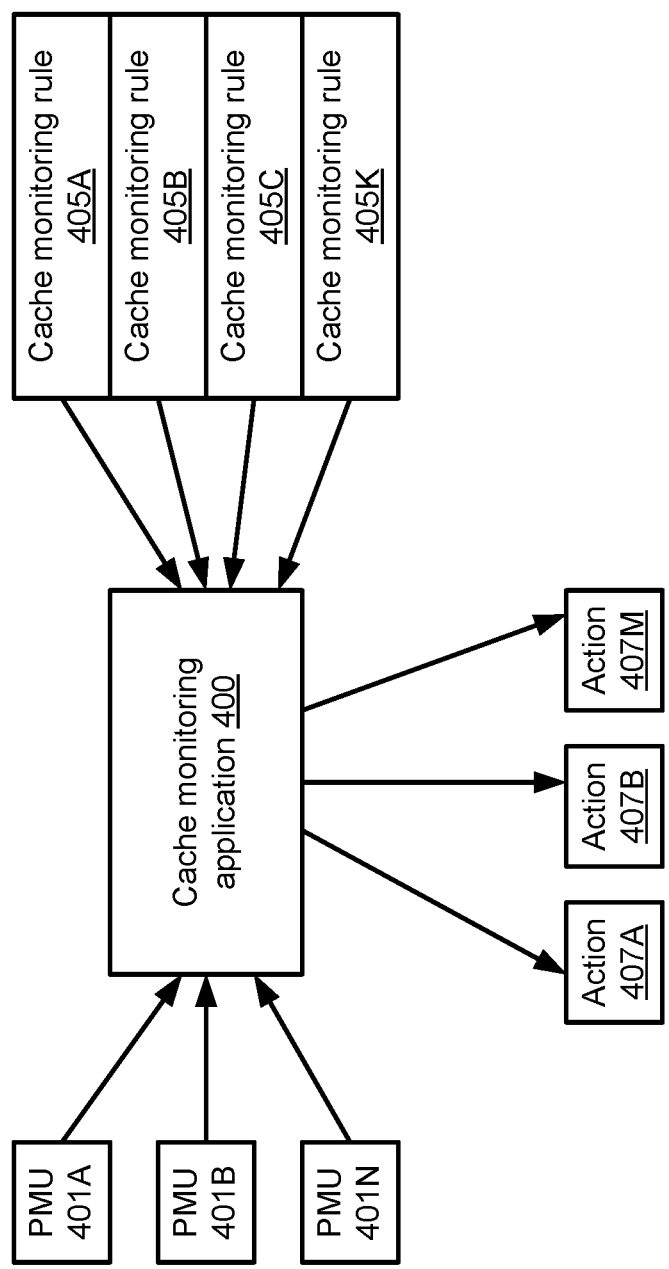
FIG. 4 schematically illustrates operation of a cache monitoring application that is employed to trigger a corrective action which is defined by a set of configurable rules, in accordance with one or more aspects of the present disclosure.

FIG. 4 schematically illustrates operation of a cache monitoring application that is employed to trigger a corrective action which may be defined by a set of configurable rules, in accordance with one or more aspects of the present disclosure. As shown in FIG. 4, the cache monitoring application 400 tracks access status of one or more cache lines by reading one or more PMUs 401A-401N. The actions to be performed by the cache monitoring application 400 may be defined by the cache monitoring policy 403, which may include one or more cache monitoring rules 405A-405K. Each cache monitoring rule may define one or more actions 407A-407M to be performed responsive to successfully evaluating a logical condition specified by the rule. In an illustrative example, the cache monitoring application 400 instructs the cache line producing application (e.g., a NIC driver) to reduce the cache utilization by discarding the received data frames or to modify medium access control (MAC) layer and/or network layer protocol parameters in order to reduce the rate of incoming frames. In another illustrative example, the cache monitoring application instructs the cache line producing device (e.g., a DDIO-enabled device) or the cache line producing application (e.g., a NIC driver) to reduce the cache utilization by storing the received data frames in the next level cache or in the main memory. In yet another illustrative example, the cache monitoring application requests increase of the number of the DDIO cache ways in order to compensate the data consumption rate (i.e., the cache line consuming application reading the cache lines) falling below the cache line production rate. While the above-described examples are directed to network interface cards and/or other network devices, the systems and methods described herein may be utilized by other types of devices.

Figure 5:
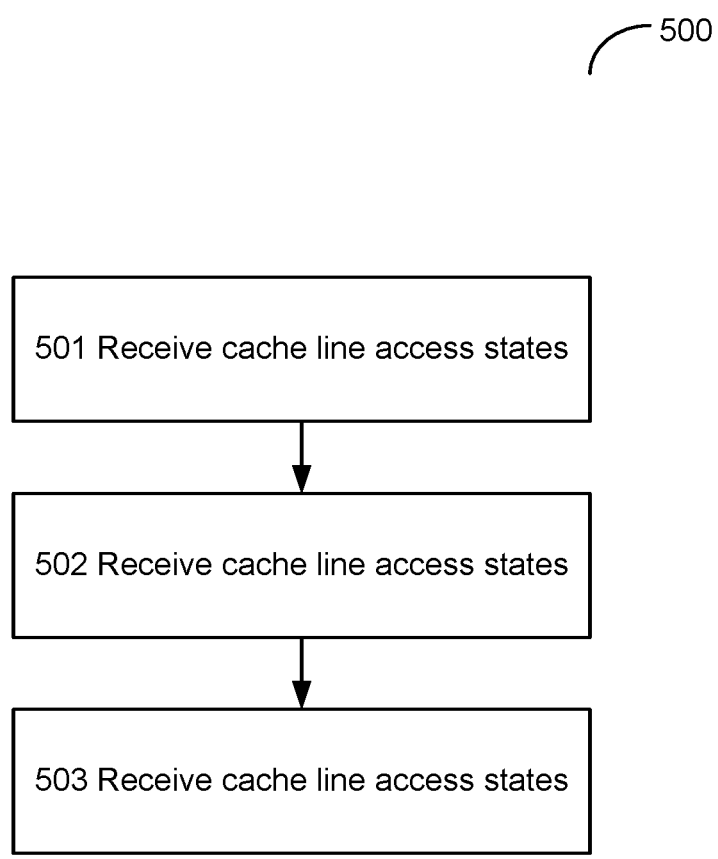
FIG. 5 represents a block diagram illustrating an example method of cache monitoring, in accordance with one or more aspects of the present disclosure.

FIG. 5 illustrates an example method 500 of cache monitoring, in accordance with one or more aspects of the present disclosure. Method 500 may be performed by processing logic that may comprise hardware (e.g., circuitry, dedicated logic, programmable logic, microcode, etc.), software (such as operations being performed by a functional unit), firmware or a combination thereof. In certain implementations, method 500 is performed by a processor 100 of FIG. 1. Alternatively, some or all of the operations of method 500 may be performed by other components of an example processing system.

Referring to FIG. 5, method 500 begins at block 501, by the cache monitoring application receiving an aggregate value that reflects the cache line access states. As noted herein above, each cache line includes an access tracking flag, which may be set or cleared by the cache controller to indicate whether the cache line has been produced (created or updated) or consumed (accessed). The cache monitoring application reads one or more PMUs that indicate the frequency of switching states of one or more cache line access tracking flags, the ratio of the number of evicted cache lines which have not been read to the total number of evicted cache lines, the ratio of the number of evicted cache lines which have not been read to the total number of cache lines, and/or other aggregate functions of the cache line access states.

At block 502, the cache monitoring application determines, using a cache access tracking policy, an action identified by the aggregate value reflecting the access states of the plurality of cache lines. The cache access tracking policy may include a plurality of cache access tracking rules, such that each rule specifies an action to be performed responsive to evaluating a logical condition defined on the aggregate value reflecting the cache line access state, as described in more detail herein above.

At block 503, the cache monitoring application performs the identified action. In an illustrative example, the action causes the cache producing device (e.g., a DDIO-enabled device or a memory agent represented by a CPU or graphic processing unit (GPU)) to modify its operational parameters in order to reduce the cache utilization (e.g., by reducing the rate of producing the data to be stored in the cache hierarchy). In another illustrative example, the action causes the cache producing application to reduce the cache utilization, e.g., by storing data in the next level cache. In yet another illustrative example, the action increases the number of Data Direct Input/Output (DDIO) cache ways, as described in more detail herein above.

Figure 6:
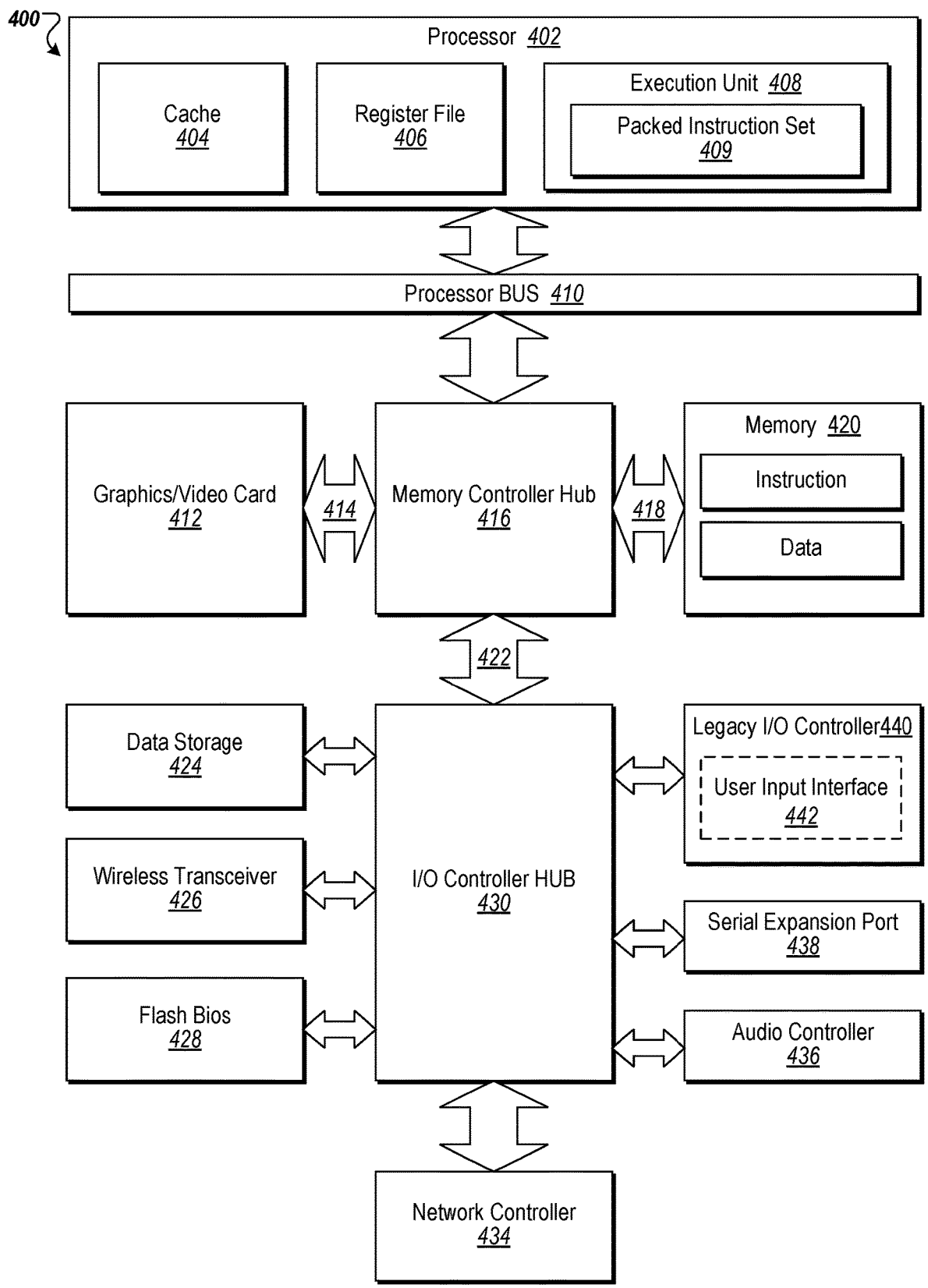
FIG. 6 is a block diagram of an exemplary computer system, in accordance with one or more aspects of the present disclosure.

FIG. 6 illustrates a block diagram of an example computer system formed with a processor that includes execution units to execute an instruction, where one or more components implement one or more features in accordance with one or more aspects of the present disclosure is illustrated. System 400 includes a component, such as a processor 402 to employ execution units including logic to perform algorithms for processing data, in accordance with the implementation described herein. Implementations of the present disclosure are not limited to any specific combination of hardware circuitry and software.

Implementations are not limited to computer systems. Alternative implementations of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one implementation.

In this illustrated implementation, processor 402 includes one or more execution units 408 to implement an algorithm that is to perform at least one instruction. One implementation may be described in the context of a single processor desktop or server system, but alternative implementations may be included in a multiprocessor system. System 400 is an example of a 'hub' system architecture. The computer system 400 includes a processor 402 to process data signals. The processor 402, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 402 is coupled to a processor bus 410 that transmits data signals between the processor 402 and other components in the system 400. The elements of system 400 (e.g. graphics accelerator 412, memory controller hub 416, memory 420, I/O controller hub 424, wireless transceiver 426, Flash BIOS 428, Network controller 434, Audio controller 436, Serial expansion port 438, I/O controller 430, etc.) perform their conventional functions that are well known to those familiar with the art.

In one implementation, the processor 402 includes a Level 1 (L1) internal cache memory 404. Depending on the architecture, the processor 402 may have a single internal cache or multiple levels of internal caches. Other implementations include a combination of both internal and external caches depending on the particular implementation and needs. The cache controller may implement the cache line status monitoring functionality, as described herein. Register file 406 is to store different types of data in various registers including integer registers, floating point registers, vector registers, banked registers, shadow registers, checkpoint registers, status registers, and instruction pointer register.

Execution unit 408, including logic to perform integer and floating point operations, also resides in the processor 402. The processor 402, in one implementation, includes a microcode (ucode) ROM to store microcode, which when executed, is to perform algorithms for certain macroinstructions or handle complex scenarios. Here, microcode is potentially updateable to handle logic bugs/fixes for processor 402. For one implementation, execution unit 408 includes logic to handle a packed instruction set 409. By including the packed instruction set 409 in the instruction set of a general-purpose processor 402, along with associated circuitry to execute the instructions, the operations used by many multimedia applications may be performed using packed data in a general-purpose processor 402. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate implementations of an execution unit 408 may also be used in micro controllers, embedded processors, graphics devices, DSPs, and other types of logic circuits. System 400 includes a memory 420. Memory 420 includes a dynamic random access memory (DRAM) device, a static random access memory (SRAM) device, flash memory device, or other memory device. Memory 420 stores instructions and/or data represented by data signals that are to be executed by the processor 402.

A system logic chip 416 is coupled to the processor bus 410 and memory 420. The system logic chip 416 in the illustrated implementation is a memory controller hub (MCH). The processor 402 may communicate to the MCH 416 via a processor bus 410. The MCH 416 provides a high bandwidth memory path 418 to memory 420 for instruction and data storage and for storage of graphics commands, data and textures. The MCH 416 is to direct data signals between the processor 402, memory 420, and other components in the system 400 and to bridge the data signals between processor bus 410, memory 420, and system I/O 422. In some implementations, the system logic chip 416 may provide a graphics port for coupling to a graphics controller 412. The MCH 416 is coupled to memory 420 through a memory interface 418. The graphics card 412 is coupled to the MCH 416 through an Accelerated Graphics Port (AGP) interconnect 414. A cache may also be implemented in the Memory Controller Hub 416 to provide a faster response than memory 420. The cache lines may include the metadata comprising the cache line access tracking flag 222, as described herein.

System 400 may use a proprietary hub interface bus 422 to couple the MCH 416 to the I/O controller hub (ICH) 430. The ICH 430 provides direct connections to some I/O devices via a local I/O bus. The local I/O bus is a high-speed I/O bus for connecting peripherals to the memory 420, chipset, and processor 402. Some examples are the audio controller, firmware hub (flash BIOS) 428, wireless transceiver 426, data storage 424, legacy I/O controller containing user input and keyboard interfaces, a serial expansion port such as Universal Serial Bus (USB), and a network controller 434. The data storage device 424 may comprise a hard disk drive, a floppy disk drive, a CD-ROM device, a flash memory device, or other mass storage device.

For another implementation of a system, an instruction in accordance with one implementation may be used with a system on a chip. One implementation of a system on a chip comprises of a processor and a memory. The memory for one such system is a flash memory. The flash memory may be located on the same die as the processor and other system components. Additionally, other logic blocks such as a memory controller or graphics controller may also be located on a system on a chip.

Figure 7:
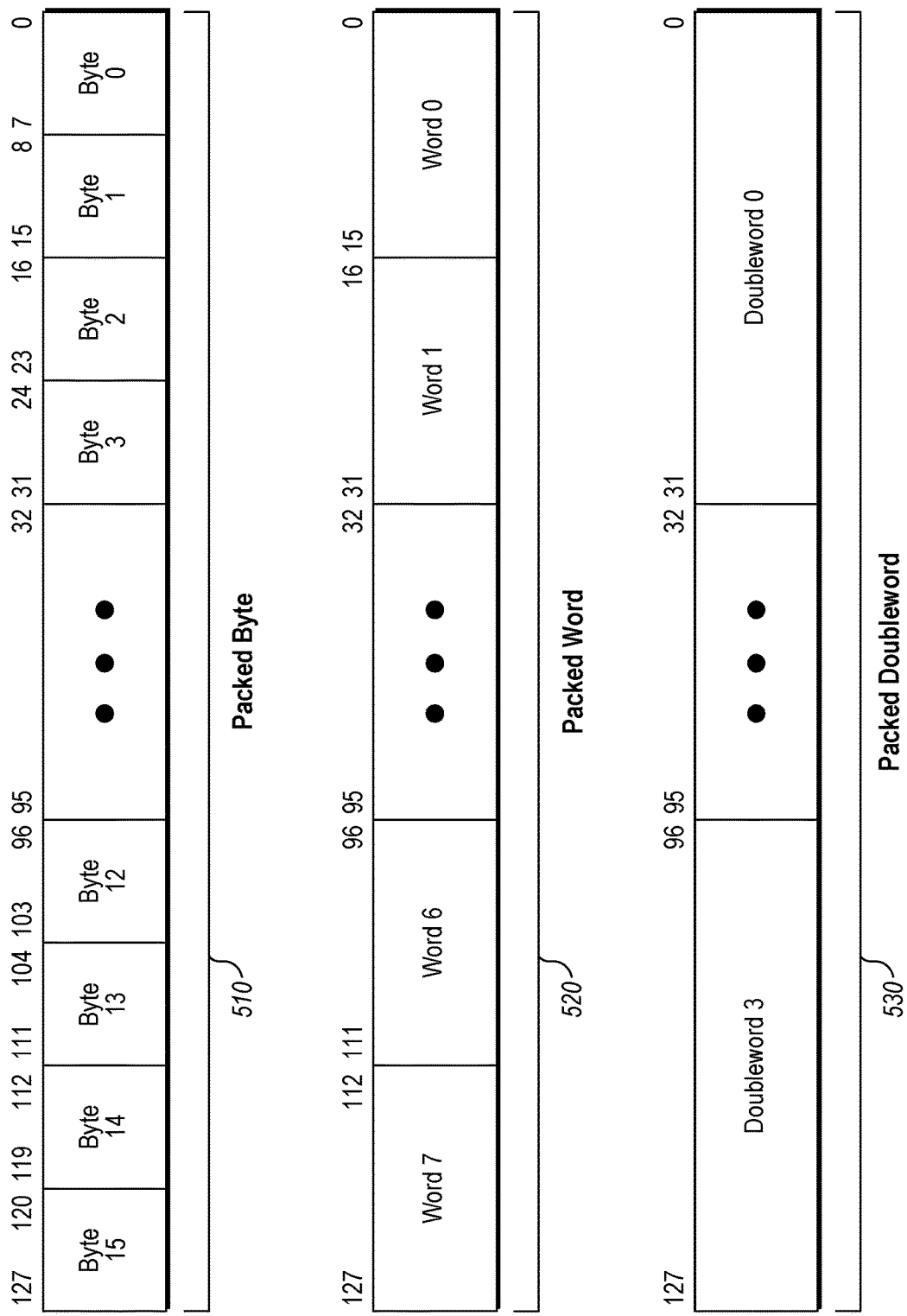
FIG. 7 illustrates packed data types, in accordance with one or more aspects of the present disclosure.

FIG. 7 illustrates various packed data type representations in multimedia registers according to one implementation of the present disclosure. FIG. 7 illustrates data types for a packed byte 510, a packed word 520, and a packed doubleword (dword) 530 for 128 bits wide operands. The packed byte format 510 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation may now be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 7 are 128 bit long, implementations may also operate with 64 bit wide or other sized operands. The packed word format 520 of this example is 128 bits long and contains eight packed word data elements. Each packed word contains sixteen bits of information. The packed doubleword format 530 of FIG. 7 is 128 bits long and contains four packed doubleword data elements. Each packed doubleword data element contains thirty two bits of information. A packed quadword is 128 bits long and contains two packed quad-word data elements.

FIG. 8A is a block diagram illustrating an in-order pipeline and a register renaming stage, out-of-order issue/execution pipeline according to at least one implementation of the disclosure. FIG. 8B is a block diagram illustrating an in-order architecture core and a register renaming logic, out-of-order issue/execution logic to be included in a processor according to at least one implementation of the disclosure. The solid lined boxes in FIG. 8A illustrate the in-order pipeline, while the dashed lined boxes illustrates the register renaming, out-of-order issue/execution pipeline. Similarly, the solid lined boxes in FIG. 8B illustrate the in-order architecture logic, while the dashed lined boxes illustrates the register renaming logic and out-of-order issue/execution logic.

In FIG. 8A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

In FIG. 8B, arrows denote a coupling between two or more units and the direction of the arrow indicates a direction of data flow between those units. FIG. 8B shows processor core 690 including a front end unit 630 coupled to an execution engine unit 650, and both are coupled to a memory unit 670.

The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to a level 2 (L2) cache unit 676 in the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 162 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some implementations may include a number of execution units dedicated to specific functions or sets of functions, other implementations may include one execution unit or multiple execution units that all perform all functions. The scheduler unit(s) 656, physical register file(s) unit(s) 658, and execution cluster(s) 660 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations are implemented in which the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary implementation, the memory access units 664 may include a load unit, a store address unit, and a store data unit, each of which is coupled to the data TLB unit 672 in the memory unit 670. The L2 cache unit 676 is coupled to one or more other levels of cache and eventually to a main memory. The L2 cache unit 676 may implement the cache access tracking functionality, as described herein.

By way of example, the register renaming, out-of-order issue/execution core architecture may implement the pipeline 500 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

While register renaming is described in the context of out-of-order execution, it should be understood that register renaming may be used in an in-order architecture. While the illustrated implementation of the processor also includes a separate instruction and data cache units 634/674 and a shared L2 cache unit 676, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

Figure 9:
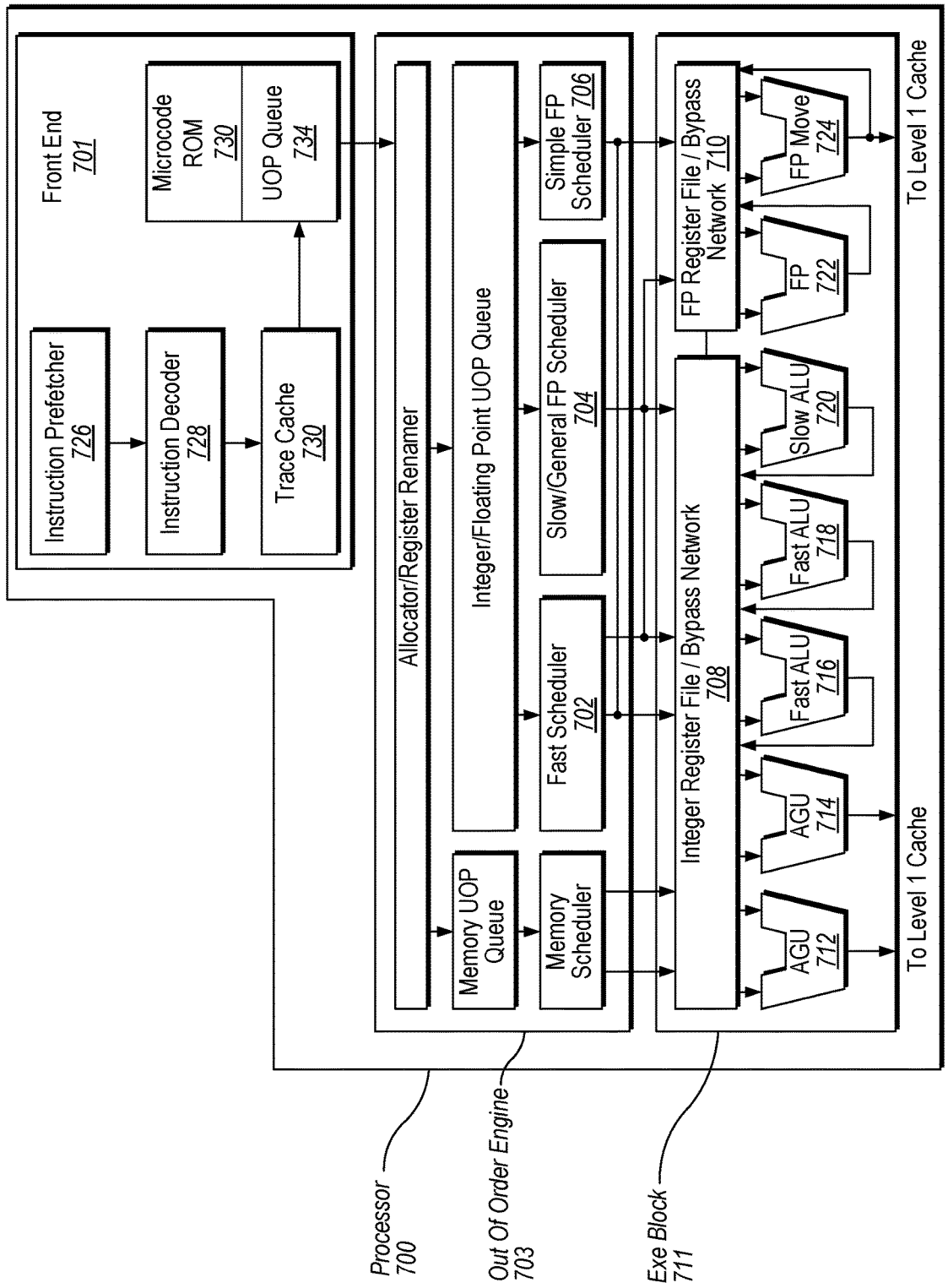
FIG. 9 is a block diagram of a processor operating in accordance with one or more aspects of the present disclosure.

FIG. 9 is a block diagram of the micro-architecture for a processor 700 that includes logic circuits to perform instructions in accordance with one implementation of the present disclosure. In some implementations, an instruction in accordance with one implementation may be implemented to operate on data elements having sizes of byte, word, doubleword, quadword, etc., as well as datatypes, such as single and double precision integer and floating point datatypes. In one implementation the in-order front end 701 is the part of the processor 700 that fetches instructions to be executed and prepares them to be used later in the processor pipeline. The front end 701 may include several units. In one implementation, the instruction prefetcher 726 fetches instructions from memory and feeds them to an instruction decoder 728 which in turn decodes or interprets them. For example, in one implementation, the decoder decodes a received instruction into one or more operations called "micro-instructions" or "micro-operations" (also called micro op or uops) that the machine may execute. In other implementations, the decoder parses the instruction into an opcode and corresponding data and control fields that are used by the micro-architecture to perform operations in accordance with one implementation. In one implementation, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one implementation, if more than four micro-ops are needed to complete an instruction, the decoder 728 accesses the microcode ROM 732 to do the instruction. For one implementation, an instruction may be decoded into a small number of micro ops for processing at the instruction decoder 728. In another implementation, an instruction may be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one implementation from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706 determine when a uop is ready to execute based on the readiness of their dependent input register operand sources and the availability of the execution resources the uops need to complete their operation. The fast scheduler 702 of one implementation may schedule on each half of the main clock cycle while the other schedulers may schedule once per main processor clock cycle. The schedulers arbitrate for the dispatch ports to schedule uops for execution.

Register files 708, 710 sit between the schedulers 702, 704, 706, and the execution units 712, 714, 716, 718, 720, 722, 724 in the execution block 711. There is a separate register file 708, 710 for integer and floating point operations, respectively. Each register file 708, 710, of one implementation also includes a bypass network that may bypass or forward just completed results that have not yet been written into the register file to new dependent uops. The integer register file 708 and the floating point register file 710 are also capable of communicating data with the other. For one implementation, the integer register file 708 is split into two separate register files, one register file for the low order 32 bits of data and a second register file for the high order 32 bits of data. The floating point register file 710 of one implementation has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one implementation is comprised of a number of execution units: address generation unit (AGU) 712, AGU 714, fast ALU 716, fast ALU 718, slow ALU 720, floating point ALU 722, floating point move unit 724. For one implementation, the floating point execution blocks 722, 724, execute floating point, MMX, SIMD, and SSE, or other operations. The floating point ALU 722 of one implementation includes a 64 bit by 64 bit floating point divider to execute divide, square root, and remainder micro-ops. For implementations of the present disclosure, instructions involving a floating point value may be handled with the floating point hardware. In one implementation, the ALU operations go to the high-speed ALU execution units 716, 718. The fast ALUs 716, 718, of one implementation may execute fast operations with an effective latency of half a clock cycle. For one implementation, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one implementation, the integer ALUs 716, 718, 720 are described in the context of performing integer operations on 64 bit data operands. In alternative implementations, the ALUs 716, 718, 720 may be implemented to support a variety of data bits including 16, 32, 128, 756, etc. Similarly, the floating point units 722, 724 may be implemented to support a range of operands having bits of various widths. For one implementation, the floating point units 722, 724 may operate on 128 bits wide packed data operands in conjunction with SIMD and multimedia instructions.

In one implementation, the uops schedulers 702, 704, 706 dispatch dependent operations before the parent load has finished executing. As uops are speculatively scheduled and executed in processor 700, the processor 700 also includes logic to handle memory misses. If a data load misses in the data cache, there may be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, may operate with packed data elements that accompany SIMD and SSE instructions. Similarly, 128 bits wide XMM registers relating to SSE2, SSE3, SSE4, or beyond (referred to generically as "SSEx") technology may also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers.

Figure 10:
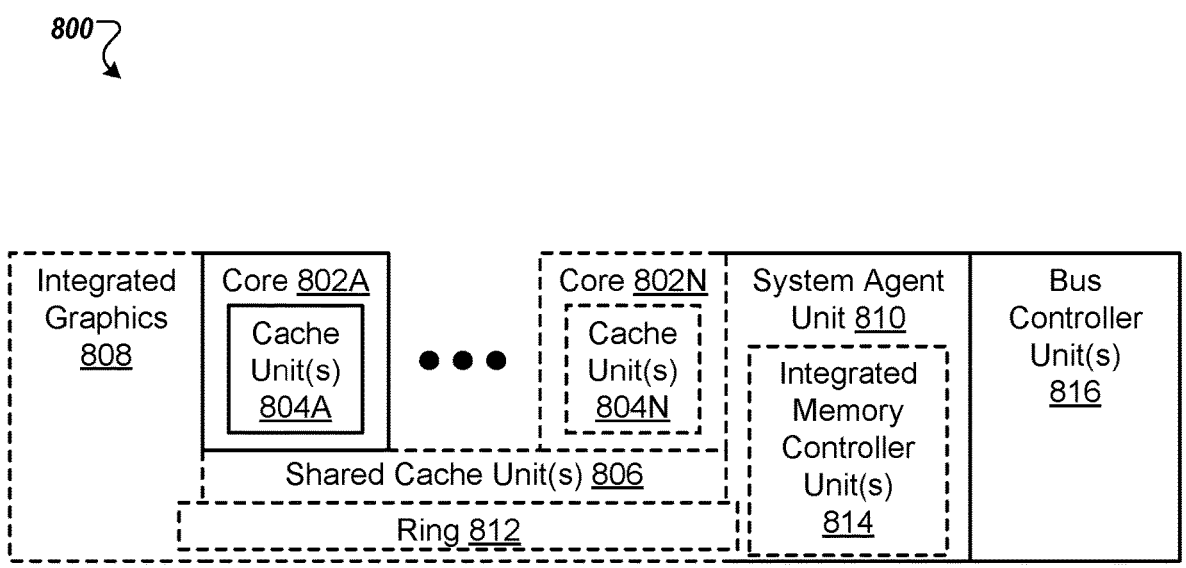
FIG. 10 is a block diagram of a processor operating in accordance with one or more aspects of the present disclosure.

FIG. 10 is a block diagram of a single core processor and a multicore processor 800 with integrated memory controller and graphics according to implementations of the disclosure. The solid lined boxes in FIG. 10 illustrate a processor 800 with a single core 802A, a system agent 810, a set of one or more bus controller units 816, while the addition of the dashed lined boxes illustrates an alternative processor 800 with multiple cores 802A-N, a set of one or more integrated memory controller unit(s) 814 in the system agent unit 810, and an integrated graphics logic 808.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. This set of shared cache units 806 may implement the cache line access tracking functionality, as described herein. While in one implementation a ring based interconnect unit 812 interconnects the integrated graphics logic 808, the set of shared cache units 806, and the system agent unit 810, alternative implementations may use any number of well-known techniques for interconnecting such units.

In some implementations, one or more of the cores 802A-N are capable of multi-threading. The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture and/or instruction set. For example, some of the cores 802A-N may be in order while others are out-of-order. As another example, two or more of the cores 802A-N may be capable of execution the same instruction set, while others may be capable of executing a subset of that instruction set or a different instruction set. As a further example, the cores may be different architecture.

The processor may include one or more different general-purpose processors, such as a Core™ i3, i5, i7, 2 Duo and Quad, Xeon™, Itanium™, Atom™, XScale™ or StrongARM™ processor, which are available from Intel Corporation, of Santa Clara, Calif. For example, one core may be a Core i7™ core while another core of the processor may be an Atom™ core. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 800 may be a part of and/or may be implemented on one or more substrates using any of a number of process technologies, such as, for example, BiCMOS, CMOS, or NMOS.

Figure 11:
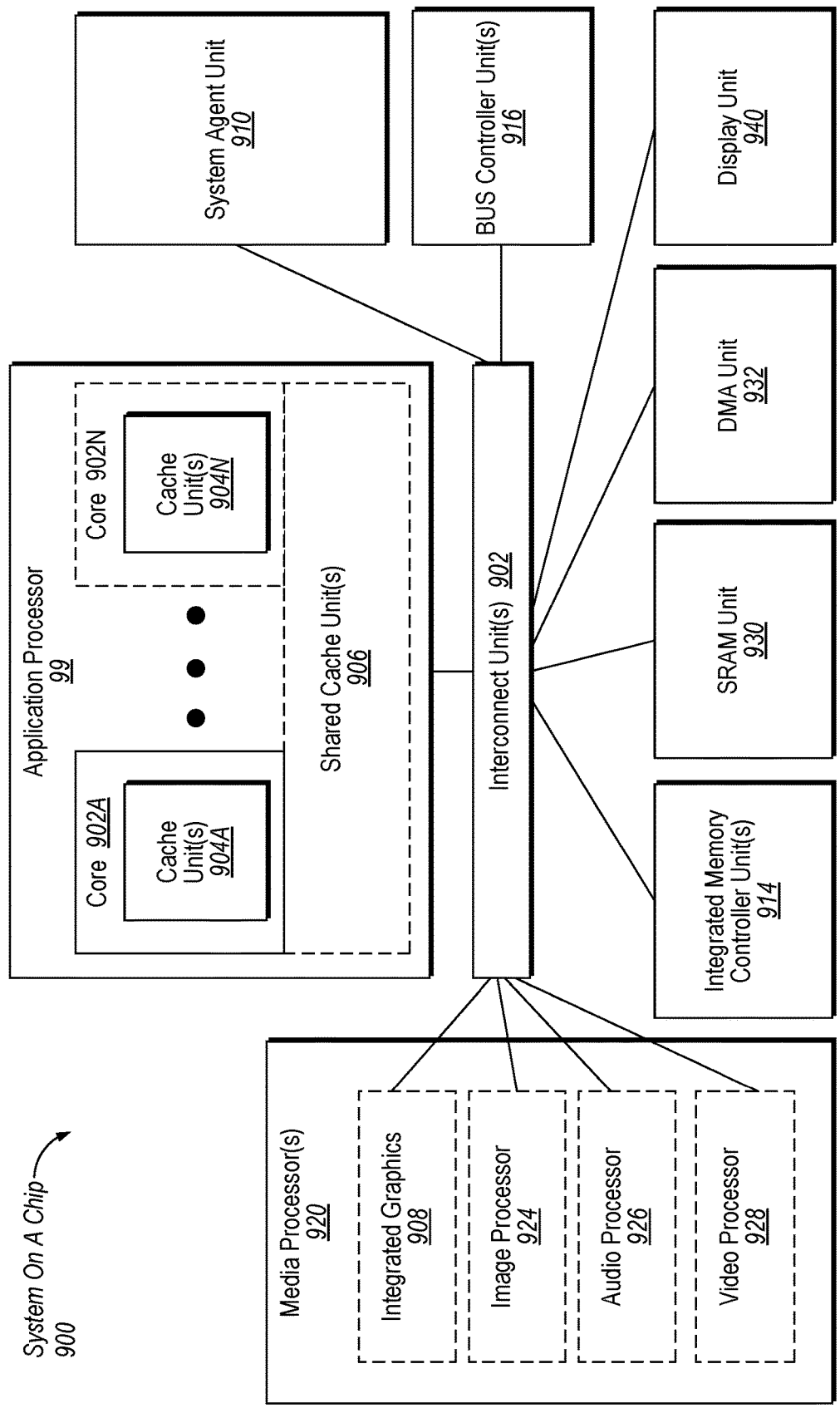
FIG. 11 is a block diagram of a system-on-a-chip operating in accordance with one or more aspects of the present disclosure.

Referring now to FIG. 11, shown is a block diagram of a SoC 900 in accordance with an implementation of the present disclosure. Similar elements in FIG. 11 bear like reference numerals. Also, dashed lined boxes are features on more advanced SoCs. In FIG. 11, an interconnect unit(s) 902 is coupled to: an application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 12:
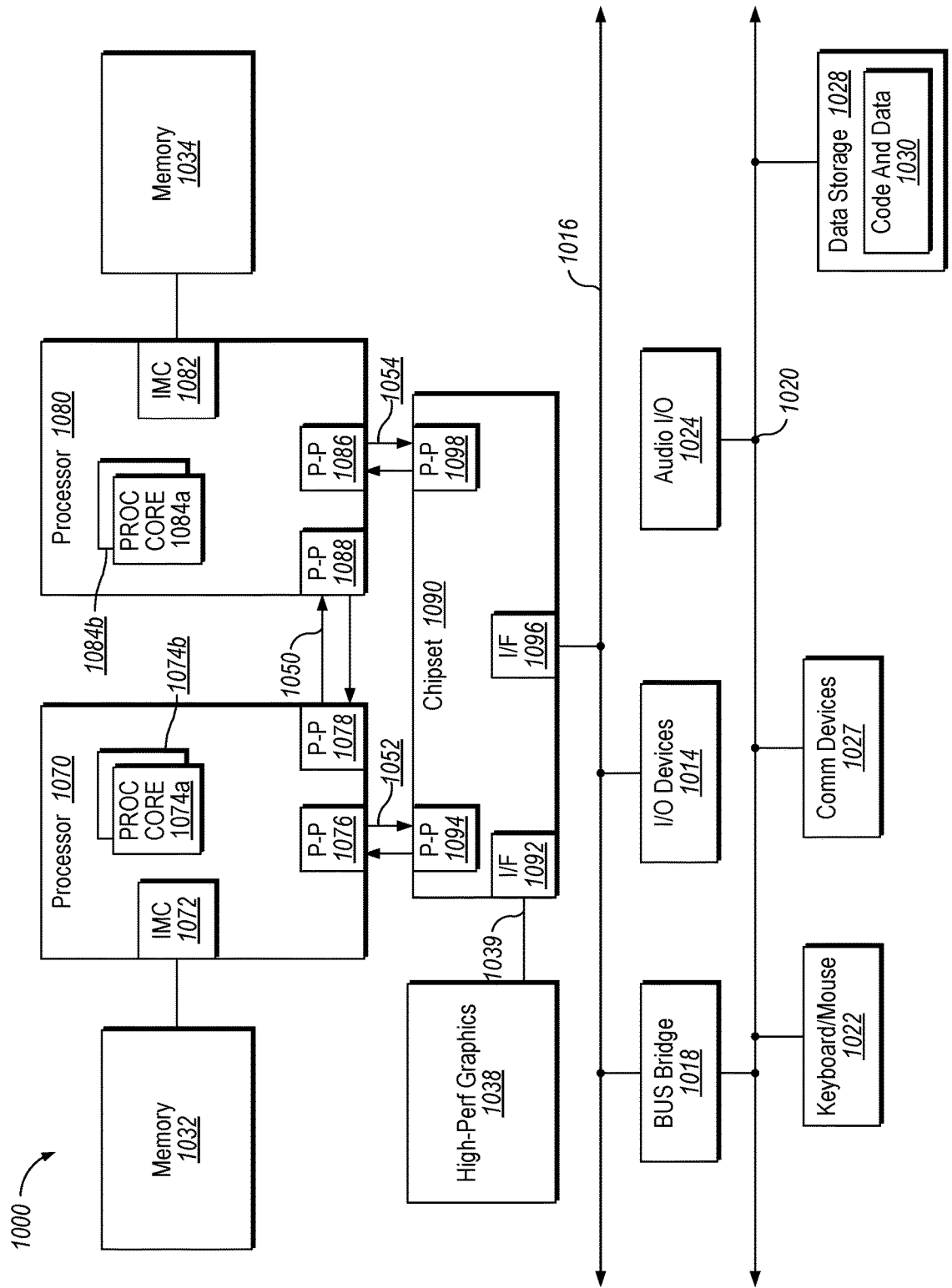
FIG. 12 is a block diagram of a computer system operating in accordance with one or more aspects of the present disclosure.

Implementations may be implemented in many different system types. Referring now to FIG. 12, shown is a block diagram of a multiprocessor system 1000 in accordance with some implementations. As shown in FIG. 12, multiprocessor system 1000 is a point-to-point interconnect system, and includes a first processor 1070 and a second processor 1080 coupled via a point-to-point interconnect 1050. As shown in FIG. 12, each of processors 1070 and 1080 may be multicore processors, including first and second processor cores (i.e., processor cores 1074a and 1074b and processor cores 1084a and 1084b), although potentially many more cores may be present in the processors. The processors each may include hybrid write mode logics in accordance with an implementation of the present.

While shown with two processors 1070, 1080, it is to be understood that the scope of the present disclosure is not so limited. In other implementations, one or more additional processors may be present in a given processor.

Processors 1070 and 1080 are shown including integrated memory controller units 8102 and 8102, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 12, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may also exchange information with a high-performance graphics circuit 1038 via a high-performance graphics interface 1039.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one implementation, first bus 1016 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1014 may be coupled to first bus 1016, along with a bus bridge 1018 which couples first bus 1016 to a second bus 1020. In one implementation, second bus 1020 may be a low pin count (LPC) bus. Various devices may be coupled to second bus 1020 including, for example, a keyboard and/or mouse 1022, communication devices 1027 and a storage unit 1028 such as a disk drive or other mass storage device which may include instructions/code and data 1030, in one implementation. Further, an audio I/O 1024 may be coupled to second bus 1020. Note that other architectures are possible. For example, instead of the point-to-point architecture of FIG. 12, a system may implement a multi-drop bus or other such architecture.

Figure 13:
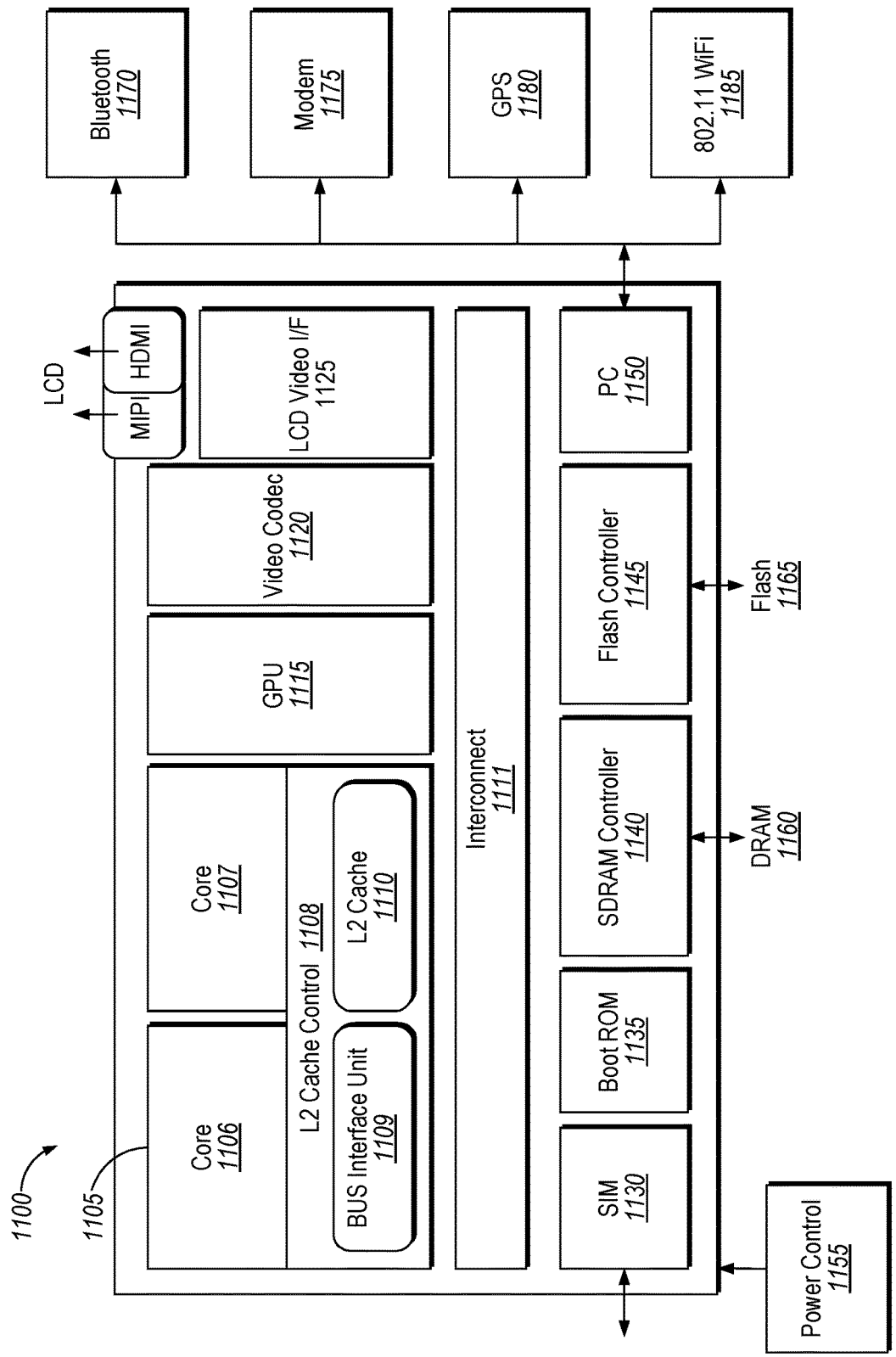
FIG. 13 illustrates another example block diagram for a computing system operating in accordance with one or more aspects of the present disclosure.

Turning next to FIG. 13, an implementation of a system on-chip (SOC) design in accordance with implementations of the disclosure is depicted. As an illustrative example, SOC 1100 is included in user equipment (UE). In one implementation, UE refers to any device to be used by an end-user to communicate, such as a hand-held phone, smart-phone, tablet, ultra-thin notebook, notebook with broadband adapter, or any other similar communication device. A UE may connect to a base station or node, which may correspond in nature to a mobile station (MS) in a GSM network.

Here, SOC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which may implement one or more aspects of the described disclosure.

Interconnect 1111 provides communication channels to the other components, such as a Subscriber Identity Module (SIM) 1130 to interface with a SIM card, a boot rom 1135 to hold boot code for execution by cores 1106 and 1107 to initialize and boot SOC 1100, a SDRAM controller 1140 to interface with external memory (e.g. DRAM 1160), a flash controller 1145 to interface with persistent or non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the implementations described herein.

In addition, the system illustrates peripherals for communication, such as a Bluetooth module 1170, modem 1175 (e.g., 3G, 4G, Long Term Evolution (LTE), LTE-Advanced, etc.), GPS 1180, Wi-Fi 1185, Zigbee (not shown), and Z-Wave (not shown). Note as stated above, a UE includes a radio for communication. As a result, these peripheral communication modules may not all be included. However, in a UE some form of a radio for external communication should be included.

Figure 14:
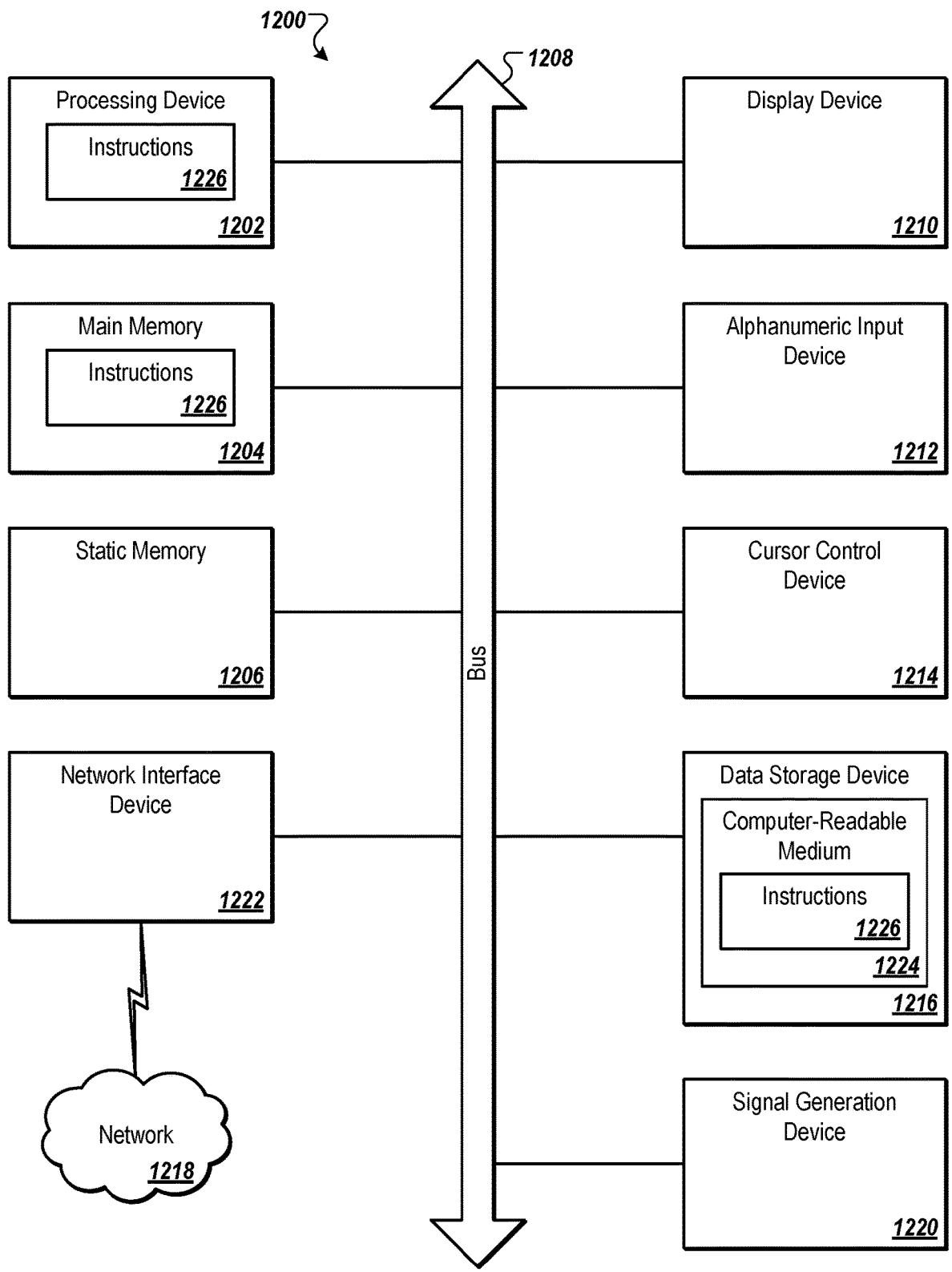
FIG. 14 illustrates a diagrammatic representation of a machine in the example form of a computing system operating in accordance with one or more aspects of the present disclosure.

FIG. 14 illustrates a diagrammatic representation of a machine in the example form of a computing system 1200 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a game console, a cellular telephone, a digital camera, a handheld PC, a web appliance, a server, a network router, switch or bridge, micro controller, a digital signal processor (DSP), system on a chip, network computers (NetPC), network hubs, wide area network (WAN) switches, or any machine capable of executing a set of instructions (sequential or otherwise) that specify actions to be taken by that machine. Further, while only a single machine is illustrated for the system architecture 100, the term "machine" shall also be taken to include any collection of machines that individually or jointly execute a set (or multiple sets) of instructions to perform any one or more of the methodologies discussed herein. Implementations are not limited to computer systems.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1216, which communicate with each other via a bus 1208.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one implementation, processing device 1202 may include one or processing cores. The processing device 1202 is configured to execute the processing logic 1226 for performing the operations discussed herein. In one implementation, processing device 1202 implement the system architecture 100 of FIG. 1. Alternatively, the computing system 1200 may include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Computing system 1200 is representative of processing systems based on the PENTIUM III™, PENTIUM 4™, Celeron™, Xeon™, Itanium, XScale™, StrongARM™, Core™, Core 2™, Atom™, and/or Intel® Architecture Core™, such as an i3, i5, i7 microprocessors available from Intel Corporation of Santa Clara, Calif., although other systems (including PCs having other microprocessors, engineering workstations, set-top boxes and the like) may also be used. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other implementations such as an Apple A5/A6 processor, a Qualcomm Snapdragon processor, or TI OMAP processor. In one implementation, processing device 1202 executes a version of the WINDOWS™ operating system available from Microsoft Corporation of Redmond, Wash., although other operating systems (OS X, UNIX, Linux, Android, iOS, Symbian, for example), embedded software, and/or graphical user interfaces, may also be used. Thus, implementations of the present disclosure are not limited to any specific combination of hardware circuitry and software. One implementation may be described in the context of a single processor desktop or server system, but alternative implementations may be included in a multiprocessor system. Computing system 1200 may be an example of a 'hub' system architecture.

The computing system 1200 may further include a network interface device 1222 communicably coupled to a network 1218. The computing system 1200 also may include a display device 1210 (e.g., a liquid crystal display (LCD) or a cathode ray tube (CRT)), an alphanumeric input device 1212 (e.g., a keyboard), a cursor control device 1214 (e.g., a mouse), a signal generation device 1220 (e.g., a speaker), or other peripheral devices. Furthermore, computing system 1200 may include a graphics processing unit (not illustrated), a video processing unit (not illustrated) and an audio processing unit (not illustrated). In another implementation, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1216 may include a computer-readable storage medium 1224 on which is stored instructions 1226 embodying any one or more of the methodologies of functions described herein. The instructions 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIG. 1A, and/or a software library containing methods that call the above applications. While the computer-readable storage medium 1224 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present implementations. The term "computer-readable storage medium" shall accordingly be taken to include, but not be limited to, solid-state memories, and optical and magnetic media.

While the present disclosure has been described with respect to a limited number of implementations, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The implementations are described with reference to hybrid-threading in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. It is described that the system may be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processor, other implementations are applicable to other types of integrated circuits and logic devices. Similar techniques and teachings of implementations of the present disclosure may be applied to other types of circuits or semiconductor devices that may benefit from higher pipeline throughput and improved performance. The teachings of implementations of the present disclosure are applicable to any processor or machine that performs data manipulations. However, the present disclosure is not limited to processors or machines that perform 512 bit, 256 bit, 128 bit, 64 bit, 32 bit, or 16 bit data operations and may be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the present disclosure rather than to provide an exhaustive list of all possible implementations of implementations of the present disclosure.

Although the below examples describe instruction handling and distribution in the context of execution units and logic circuits, other implementations of the present disclosure may be accomplished by way of a data or instructions stored on a machine-readable, tangible medium, which when performed by a machine cause the machine to perform functions consistent with at least one implementation of the disclosure. In one implementation, functions associated with implementations of the present disclosure are embodied in machine-executable instructions. The instructions may be used to cause a general-purpose or special-purpose processor that is programmed with the instructions to perform the steps of the present disclosure. Implementations of the present disclosure may be provided as a computer program product or software which may include a machine or computer-readable medium having stored thereon instructions which may be used to program a computer (or other electronic devices) to perform one or more operations according to implementations of the present disclosure. Alternatively, operations of implementations of the present disclosure might be performed by specific hardware components that contain fixed-function logic for performing the operations, or by any combination of programmed computer components and fixed-function hardware components.

Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as may be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Hexadecimal values may also be represented with a prefix, such as "0x." Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Reference throughout this specification to "one implementation" or "an implementation" means that a particular feature, structure, or characteristic described in connection with the implementation is included in at least one implementation of the present disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the present specification, a detailed description has been given with reference to specific example implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

The following examples pertain to further implementations.

Example 1 is a processing system, comprising: a cache comprising a plurality of cache entries for storing a plurality of cache lines; a processing core, operatively coupled to the cache; and a cache control logic. The cache control logic is configured to: responsive to detecting an update operation with respect to a cache line of the plurality of cache lines, set a cache line access tracking flag associated with the cache line to a first state indicating that the cache line has been produced; and responsive to detecting a read operation with respect to the cache line, set the cache line access tracking flag associated with the cache line to a second state indicating that the cache line has been consumed.

Example 2 is the processing system of Example 1, wherein the cache comprises at least one of: a level 1 (L1) cache incorporated into the processing core, a level 2 (L2) cache incorporated into the processing core, or a level 3 (L3) cache external to the processing core.

Example 3 is the processing system of any of Examples 1-2, further comprising: a model-specific register (MSR) to store states of one or more cache line access tracking flags associated with the plurality of cache lines.

Example 4 is the processing system of any of Examples 1-2, further comprising: a performance monitoring unit (PMU) to store value of an aggregate function reflecting states of a plurality of cache line access tracking flags associated with the plurality of cache lines.

Example 5 is the processing system of any of Examples 1-2, further comprising: a performance monitoring unit (PMU) to store a frequency of changing states of one or more cache line access tracking flags.

Example 6 is the processing system of any of Examples 1-2, further comprising: a performance monitoring unit (PMU) to store a ratio of a number of evicted cache lines in the first state to a total number of evicted cache lines.

Example 7 is the processing system of any of Examples 1-2, further comprising: a performance monitoring unit (PMU) to store a ratio of a number of evicted cache lines in the first state to a total number of cache lines.

Example 8 is the processing system of any of Examples 1-2, wherein the processing system is represented by a System-on-Chip.

Example 9 is a method, comprising: receiving, by a cache monitoring application, an aggregate value reflecting access states of a plurality of cache lines, wherein the access states comprise a first state indicating that a cache line of the plurality of cache lines has been produced and a second state indicating that the cache line has been consumed; determining, using a cache access tracking policy, an action identified by the aggregate value reflecting the access states of the plurality of cache lines; and performing the identified action.

Example 10 is the method of Example 9, wherein the cache access tracking policy comprises a plurality of cache access tracking rules, wherein a first cache access tracking rule of the plurality of cache access tracking rules specifies a first action to be performed responsive to successfully evaluating a first logical condition defined on the aggregate value reflecting access states of the plurality of cache lines.

Example 11 is the method of any of Examples 9-10, wherein the action comprises causing a cache producing application to reduce cache utilization.

Example 12 is the method of any of Examples 9-10, wherein the action comprises causing a cache producing application to store data in a next level cache.

Example 13 is the method of any of Examples 9-10, wherein the action comprises causing a Network Interface Card (NIC) driver to reduce cache utilization by discarding one or more received data frames.

Example 14 is the method of any of Examples 9-10, wherein the action comprises causing a Network Interface Card (NIC) driver to modify a Media Access Control (MAC) parameter in order to reduce a rate of incoming data frames.

Example 15 is the method of any of Examples 9-10, wherein the action comprises causing a DDIO-enabled device to modify an operation parameter in order to reduce cache utilization.

Example 16 is the method of any of Examples 9-10, wherein the action comprises causing a memory agent to modify an operation parameter in order to reduce cache utilization.

Example 17 is the method of any of Examples 9-10, wherein the action comprises increasing a number of Data Direct Input/Output (DDIO) cache ways.

Example 18 is an apparatus comprising: means for performing the method of any of Examples 9-17.

Example 19 is an integrated circuit comprising a cache control logic, the cache control logic configured to: responsive to detecting an update operation with respect to a cache line of a plurality of cache lines, set a cache line access tracking flag associated with the cache line to a first state indicating that the cache line has been produced; and responsive to detecting a read operation with respect to the cache line, set the cache line access tracking flag associated with the cache line to a second state indicating that the cache line has been consumed.

Example 20 is the integrated circuit of Example 19, wherein the cache control logic is further configured to: update a model-specific register (MSR) to store states of one or more cache line access tracking flags associated with the plurality of cache lines.

Example 21 is the integrated circuit of Example 19, wherein the cache control logic is further configured to: update a model-specific register (MSR) to store a value of an aggregate function reflecting states of a plurality of cache line access tracking flags associated with the plurality of cache lines.

Example 22 is the integrated circuit of Example 19, wherein the cache control logic is further configured to: update a model-specific register (MSR) to store a ratio of a number of evicted cache lines in the first state to a total number of evicted cache lines.

Example 23 is the integrated circuit of Example 19, wherein the cache control logic is further configured to: update a model-specific register (MSR) to store a frequency of changing states of one or more cache line access tracking flags.

Example 24 is the integrated circuit of Example 19, wherein the cache control logic is further configured to: update a model-specific register (MSR) to store a ratio of a number of evicted cache lines in the first state to a total number of evicted cache lines.

Example 25 is the integrated circuit of Example 19, wherein the cache control logic is further configured to: update a model-specific register (MSR) to store a ratio of a number of evicted cache lines in the first state to a total number of cache lines.

Example 26. A computer-readable non-transitory storage medium having stored thereon executable instructions that, when executed by a processing system, perform operations comprising: receiving, by a cache monitoring application, an aggregate value reflecting access states of a plurality of cache lines, wherein the access states comprise a first state indicating that a cache line of the plurality of cache lines has been produced and a second state indicating that the cache line has been consumed; determining, using a cache access tracking policy, an action identified by the aggregate value reflecting the access states of the plurality of cache lines; and performing the identified action.

Example 27 is the computer-readable non-transitory storage medium of Example 26, wherein the cache access tracking policy comprises a plurality of cache access tracking rules, wherein a first cache access tracking rule of the plurality of cache access tracking rules specifies a first action to be performed responsive to successfully evaluating a first logical condition defined on the aggregate value reflecting access states of the plurality of cache lines.

Example 28 is the computer-readable non-transitory storage medium of any of Examples 26-27, wherein the action comprises causing a cache producing application to reduce cache utilization.

Example 29 is the computer-readable non-transitory storage medium of any of Examples 26-27, wherein the action comprises causing a cache producing application to store data in a next level cache.

Example 30 is the computer-readable non-transitory storage medium of any of Examples 26-27, wherein the action comprises causing a Network Interface Card (NIC) driver to reduce cache utilization by discarding one or more received data frames.

Example 31 is the computer-readable non-transitory storage medium of any of Examples 26-27, wherein the action comprises causing a Network Interface Card (NIC) driver to modify a Media Access Control (MAC) parameter in order to reduce a rate of incoming data frames.

Example 32 is the computer-readable non-transitory storage medium of any of Examples 26-27, wherein the action comprises causing a DDIO-enabled device to modify an operation parameter in order to reduce cache utilization.

Example 33 is the computer-readable non-transitory storage medium of any of Examples 26-27, wherein the action comprises causing a memory agent to modify an operation parameter in order to reduce cache utilization.

Example 34 is the computer-readable non-transitory storage medium of any of Examples 26-27, wherein the action comprises increasing a number of Data Direct Input/Output (DDIO) cache ways.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," "monitoring," "calculating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method, comprising:
   receiving, by a cache monitoring application, an aggregate value reflecting access states of a plurality of cache lines, wherein the access states comprise a first state indicating that a cache line of the plurality of cache lines has been produced and a second state indicating that the cache line has been consumed;
   applying a cache access tracking policy comprising a rule that specifies an action to be performed responsive to successfully evaluating a logical condition defined on the aggregate value reflecting the access states of the plurality of cache lines; and
   performing the identified action.

2. The method of claim 1, wherein the action comprises causing a cache producing application to reduce cache utilization.

3. The method of claim 1, wherein the action comprises causing a cache producing application to store data in a next level cache.

4. The method of claim 1, wherein the action comprises causing a Network Interface Card (NIC) driver to reduce cache utilization by discarding one or more received data frames.

5. The method of claim 1, wherein the action comprises causing a Network Interface Card (NIC) driver to modify a Media Access Control (MAC) parameter in order to reduce a rate of incoming data frames.

6. The method of claim 1, wherein the action comprises causing a DDIO-enabled device to modify an operation parameter in order to reduce cache utilization.

7. The method of claim 1, wherein the action comprises causing a memory agent to modify an operation parameter in order to reduce cache utilization.

8. The method of claim 1, wherein the action comprises increasing a number of Data Direct Input/Output (DDIO) cache ways.

9. A processing system, comprising:
   a cache comprising a plurality of cache entries for storing a plurality of cache lines;
   a processing core, operatively coupled to the cache; and
   a cache control logic, to:
      responsive to detecting an update operation with respect to a cache line of the plurality of cache lines, set a cache line access tracking flag associated with the cache line to a first state indicating that the cache line has been produced;
      responsive to detecting a read operation with respect to the cache line, set the cache line access tracking flag associated with the cache line to a second state indicating that the cache line has been consumed;
      apply a cache access tracking policy comprising a rule that specifies an action to be performed responsive to successfully evaluating a logical condition defined on the cache line access tracking flag; and
      perform the identified action.

10. The processing system of claim 9, wherein the cache comprises at least one of: a level 1 (L1) cache incorporated into the processing core, a level 2 (L2) cache incorporated into the processing core, or a level 3 (L3) cache external to the processing core.

11. The processing system of claim 9, further comprising:
a model-specific register (MSR) to store states of one or more cache line access tracking flags associated with the plurality of cache lines.

12. The processing system of claim 9, further comprising:
a performance monitoring unit (PMU) to store value of an aggregate function reflecting states of a plurality of cache line access tracking flags associated with the plurality of cache lines.

13. The processing system of claim 9, further comprising:
a performance monitoring unit (PMU) to store a frequency of changing states of one or more cache line access tracking flags.

14. The processing system of claim 9, further comprising:
a performance monitoring unit (PMU) to store a ratio of a number of evicted cache lines in the first state to a total number of evicted cache lines.

15. The processing system of claim 9, further comprising:
a performance monitoring unit (PMU) to store a ratio of a number of evicted cache lines in the first state to a total number of cache lines.

16. An integrated circuit comprising a cache control logic, the cache control logic to:
responsive to detecting an update operation with respect to a cache line of a plurality of cache lines, set a cache line access tracking flag associated with the cache line to a first state indicating that the cache line has been produced;
responsive to detecting a read operation with respect to the cache line, set the cache line access tracking flag associated with the cache line to a second state indicating that the cache line has been consumed;
apply a cache access tracking policy comprising a rule that specifies an action to be performed responsive to successfully evaluating a logical condition defined on the cache line access tracking flag; and
perform the identified action.

17. The integrated circuit of claim 16, wherein the cache control logic is further to:
update a model-specific register (MSR) to store states of one or more cache line access tracking flags associated with the plurality of cache lines.

18. The integrated circuit of claim 16, wherein the cache control logic is further to:
update a model-specific register (MSR) to store a value of an aggregate function reflecting states of a plurality of cache line access tracking flags associated with the plurality of cache lines.

19. The integrated circuit of claim 16, wherein the cache control logic is further to:
update a model-specific register (MSR) to store a ratio of a number of evicted cache lines in the first state to a total number of evicted cache lines.

* * * * *